United States Patent Office 3,729,566
Patented Apr. 24, 1973

3,729,566
RODENT STERILANT PROCESS
Ronald J. Ericsson, Oshtemo, and Daniel Lednicer and Gilbert A. Youngdale, Portage, Mich., assignors to The Upjohn Company, Kalamazoo, Mich.
No Drawing. Continuation-in-part of application Ser. No. 764,927, Oct. 3, 1968, which is a continuation-in-part of application Ser. No. 683,613, Nov. 13, 1967, both now abandoned. This application May 25, 1971, Ser. No. 146,807
Int. Cl. A01n 9/24; A61k 27/00
U.S. Cl. 424—342                                    5 Claims

ABSTRACT OF THE DISCLOSURE

Pharmaceutical preparations in dosage forms consisting essentially of compatible pharmaceutically acceptable carriers, oral and injectable, compounded with an effective amount for preventing impregnation by sexually mature male rats of a compound of the formula $$YR_1OCH_2CH(OR)CH_2Cl,$$

wherein Y is OH or $ClCH_2CH(OR)CH_2O$—; $R_1$ is chosen from the group consisting of an alkylene radical of 2 to 16 carbon atoms, inclusive; an alkenylene radical of 4 to 16 carbon atoms, inclusive; and an alkynylene radical of 4 to 16 carbon atoms, inclusive; and R is hydrogen or an acyl radical of a hydrocarbon carboxylic acid of 1 to 18 carbon atoms, inclusive. Preferred compounds are those of the given formula wherein R is hydrogen. Methods of preventing impregnation by sexually mature male rats which comprise administering systemically to the rats an effective amount for preventing impregnation of a compound as described, suitably compounded into a dosage form of a pharmaceutical preparation.

CROSS REFERENCE TO RELATED APPLICATIONS

This application is a continuation-in-part of copending application Ser. No. 764,927, filed Oct. 3, 1968, now abandoned, which in turn is a continuation-in-part of application Ser. No. 682,613, filed Nov. 13, 1967, now abandoned.

BRIEF SUMMARY OF THE INVENTION

This invention relates to pharmaceutical preparations and methods of use thereof. The pharmaceutical preparations are compounded with oral and injectable carriers to prepare capsules, both hard and soft, elixirs, emulsions, solutions, suspensions, syrups, and injectables. The preparations contain an effective amount of the essential active ingredients as heretofore described for bringing about antifertility action in sexually mature male rats.

DETAILED DESCRIPTION

The pharmaceutical preparations are compounded along with suitable oral and injectable carriers to prepare the aforesaid dosage forms. The capsules for oral use are hard gelatin capsules or soft gelatin capsules, containing the active ingredients alone or admixed with an edible oily medium, for example, cottonseed oil, peanut oil and mineral oil. Elixirs and syrups are formulated with suitable sweetening agents, for example, saccharin, cyclamate, and sucrose, and diluents, for example, ethanol, glycerol, and sorbitol. They may contain a demulcent and are preferably flavored and colored to provide orally acceptable preparations. Advantageously they contain a suitable preservative such as methyl- or propyl paraben. Emulsions suitable for oral use are of both the oil and water types. The essential active ingredient may be in the form of a water-insoluble liquid which is dispersed in the emulsion bases. The emulsions contain emulsifying agents such as acacia and tragacanth and surfactants, for example, polysorbate 80 and polyoxalkol. Oil dispersions contain the essential active ingredient and suitably include a demulcent, for example, carboxymethylcellulose, alginate, polyvinylpyrrolidone, along with a dispersing agent such as lecithin. The dispersions also contain suitable preservatives, for example, propylparaben. Dosage forms for injectable use are sterile solutions, the compounds themselves in sterile form, and sterile emulsions. Such preparations for injectable use must be sterile and must contain bacteriostatic and preservative agents, according to the art.

Any specific form for dosing the male rats contains an effective amount for antifertility action of a compound of the formula $YR_1OCH_2CH(OR)CH_2Cl$, wherein Y is OH or $ClCH_2CH(OR)CH_2O$—; $R_1$ is chosen from the group consisting of an alkylene radical of 2 to 16 carbon atoms, inclusive; an alkenylene radical of 4 to 16 carbon atoms, inclusive; and an alkynylene radical of 4 to 16 carbon atoms, inclusive; and R is hydrogen or an acyl radical of a hydrocarbon carboxylic acid of 1 to 18 carbon atoms, inclusive. Preferred compounds are those of the given formula wherein R is hydrogen.

Representative dichloro-dihydroxy compounds of the foregoing formula and methods for their preparation have been described in the literature. See, for example, U.S. Pats. 2,792,381 and 2,921,050 and British Pats. 794,632 and 970,268.

The general procedure for the preparation of dichloro-dihydroxy compounds and monochloro-dihydroxy compounds comprises reaction of a diol (i.e., glycol), $HOR_1OH$ in which $R_1$ is alkylene, alkenylene or alkynylene as defined above, with epichlorohydrin with or without the presence of an acid catalyst. The acid catalyst is aluminum chloride, stannic chloride, boron trifluoride, sulfuric acid, boric acid, phosphoric acid, or other strong acid. Stoichiometrically, equimolecular amounts of the glycol and epichlorohydrin reactants are required in the case of monochlorodihydroxy compounds; two molecular equivalents to epichlorohydrin for each molecular equivalent of glycol in the case of dichloro-dihydroxy compounds. The reactions are illustrated by the following equations:

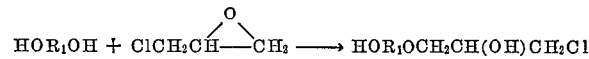

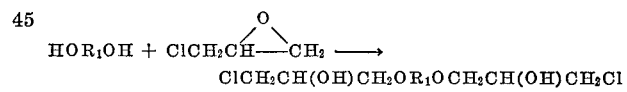

In these equations $R_1$ is as defined above.

The dichloro-dihydroxy compounds can be converted to mono-esters or di-esters by conventional procedures, for example, by reaction with acid halide or an acid anhydride as illustrated by the following equations:

$ClCH_2CH(OH)CH_2OR_1OCH_2CH(OH)CH_2Cl + RX \rightarrow$
$\quad ClCH_2CH(OH)CH_2OR_1OCH_2CH(OR)CH_2Cl$ $ClCH_2CH(OH)CH_2OR_1OCH_2CH(OH)CH_2Cl + 2RX \rightarrow$
$\quad ClCH_2CH(OR)CH_2OR_1OCH_2CH(OR)CH_2Cl$ $ClCH_2CH(OH)CH_2OR_1OCH_2CH(OH)CH_2Cl + ROR \rightarrow$
$\quad ClCH_2CH(OR)CH_2OR_1OCH_2CH(OR)CH_2Cl$ $ClCH_2CH(OH)CH_2OR_1OCH_2CH(OH)CH_2Cl + 2ROR \rightarrow$
$\quad ClCH_2CH(OR)CH_2OR_1OCH_2CH(OR)CH_2Cl$ In these equations $R_1$ is as defined above, X is chlorine or bromine, and R is acyl of 2 to 18 carbon atoms, inclusive. These mono-esters and di-esters in which R is formyl can be prepared by reacting the aforesaid dichloro-dihydroxy compounds with formic acetic anhydride.

Using similar procedures, the aforesaid monochloro-dihydroxy compounds can be converted to mono-esters and diesters in which R is acyl of 1 to 18 carbon atoms, inclusive.

The compounds can be purified by distillation or column chromatography on silica gel or by a combination of these methods.

The dials of formula $HOR_1OH$, many of which are known, can be prepared by known procedures. See, for example, Wagner and Zook, "Synthetic Organic Chemistry," chapter 5, John Wiley and Sons, Inc., New York, 1953; Grob and Moesch, Helv. Chim. Acta 42, 728 (1959); Crombie and Jacklin, J. Chem. Soc. 1622 (1957).

Illustrative diols are ethylene glycol, propylene glycol, trimethylene glycol, tetramethylene glycol, 2-butenylene glycol, 2-butynylene glycol, pentamethylene glycol, 2,2-dimethyl-1,3-propanediol, hexamethylene glycol, 2-ethyl-1,6-hexanediol, octamethylene glycol, decamethylene glycol, tetradecamethylene glycol, pentadecamethylene glycol, 2-pentadecenylene glycol, 2-pentadecynylene glycol, and hexadecamethylene glycol.

The aforesaid acyl radicals of a hydrocarbon carboxylic acid of 1 to 18 carbon atoms, inclusive, are for example, acetyl, propionyl, butyryl, isobutyryl, valeryl, isovaleryl, caproyl (2 to 6 carbon atoms), decanoyl, undecanoyl, lauroyl, (2 to 12 carbon atoms), formyl, hexadecanoyl, heptadecanoyl, stearoyl, acryloyl, and benzoyl. Alkylene radicals of 2 to 16 carbon atoms, inclusive, are, for example, ethylene propylene, trimethylene, tetramethylene, 2,2-dimethyltrimethylene, pentamethylene, 2-methyltetramethylene, hexamethylene, heptamethylene, octamethylene (2 to 8 carbon atoms), tetradecamethylene, pentadecamethylene, hexadecamethylene, and the others within the group as known in the art. Alkenylene radicals of 4 to 16 carbon atoms, inclusive, are, for example, 2-butenylene, 2-pentenylene, 3-hexenylene, 7-tetradecenylene, 2-pentadecenylene, and 4-hexadecenylene, and the others within the group as known in the art. Alkynlene radicals of 4 to 16 carbon atoms, inclusive, are, for example, 2-butynylene, 2-pentynylene, 3-hexynylene, 7-tetradecynylene, 2-pentadecynylene, and 4-hexadecynylene, and the others within the group as known to those skilled in the art.

Oral dosage forms, as heretofore described, contain from about 0.25 to about 2.5 gm. of the essential active ingredient per unit dose but are not limited thereto, since within such range they include, for example, 0.5 gm., 1 gm., and 2 gm. Sterile liquid forms for injectable administration contain from about 25% to 100% of the essential active ingredient, but are not limited thereto, since they include within this range, for example, 30%, 40%, and 60%. Liquid oral dosage forms contain about 5% to 100% of the essential active ingredient but are not limited thereto, since they include within this range, for example, 10%, 15%, 50% and 75%. These dosage forms provide, generally, a dosage range of essential active ingredient from about 0.25 to about 2.5 gm. per day. The daily oral and parenteral doses are approximately the same except for sustained parenteral dosage forms which contain from about 0.25 to about 1 gm. of essential active ingredient per ml. and are given once a month intramuscularly. The usual oral and parenteral forms are to be administered once per day. Other ingredients, which are, however, not essential to the present invention, are, for example, a progestational agent such as medroxyprogesterone or melengestrol acetate, given in the usual dosage amounts for such active ingredient.

Mature virgin male rats are checked for ability to mate by placement with mature female rats primed with ponadotropic factor of pregnant mare's serum. Those males which mate are used for subcutaneous injection or oral administration of the novel pharmaceutical preparations. The essential active ingredient is prepared as a 30 mg./ml. dispersion in 0.25% aqueous methylcellulose in sterile vehicle. This pharmaceutical composition is administered to each of three mature mating males, a half ml. per day subcutaneously or orally, for eight days. These treated males are exposed to receptive mature females for mating and mating is checked by the presence of sperm with or without a plug in the vagina of the female. Approximately ten days thereafter, the females are examined for the presence and number of implantation sites, and the ability of the pharmaceutical compositions to prevent impregnation by the mature mating male is shown by the absence of implantation sites at autopsy.

Pharmaceutical dispersions, 30 mg./ml., in aqeous methylcellulose were prepared of each of the following compounds for antifertility activity testing by ability to prevent impregnation by sexually mature mating male rats.

One half to one ml. per day was administered to the rats in accordance with the aforesaid procedure and all dispersions were capable of preventing impregnation.

1,1'-(ethylenedioxy)bis[3-chloro-2-propanol]
1,1'-(trimethylenedioxy)bis[3-chloro-2-propanol]
1,1'-(pentamethylenedioxy)bis[3-chloro-2-propanol]
1,1'-(decamethylenedioxy)bis[3-chloro-2-propanol]
1-chloro-3-(2-hydroxyethoxy)-2-propanol
5-(3-chloro-2-hydroxypropoxy)-1-pentanol
1,1'-(propylenedioxy)bis[3-chloro-2-propanol]
1,1'-(2-butynylenedioxy)bis[3-chloro-2-propanol]
1,1'-(pentamethylenedioxy)bis[3-chloro-2-propanol] monoacetate
1,1'-(pentamethylenedioxy)bis[3-chloro-2-propanol] diacetate The following examples illustrate the manner and process of making and using the invention but are not to be construed as limiting.

Example 1

Cottonseed oil is used as a sterile vehicle to prepare a sterile solution of 1,1'-(2-butynylenedioxy)bis[3-chloro-2-propanol], 30 mg./ml. injection of 1 ml. daily to sexually mature male rats is effective in preventing impregnation as a result of successful mating.

Example 2

Cottonseed oil is used as a sterile vehicle to prepare a sterile solution of 1-chloro-3-(2-hydroxyethoxy)-2-propanol, 30 mg./ml. Injection of 1 ml. daily to sexually mature male rats is effective in preventing impregnation as a result of successful mating.

Additional embodiments of the present inventive concept are compositions, i.e., rations, for oral ingestion by rodents, especially rats, and methods of controlling rodent population, especially the rat population. Such rations contain the essential active ingredient and, in amounts that are attractive to the animals in the sense that they are not repelled thereby, edible dietary constituents such as protein, fat, carbohydrate, minerals and vitamins.

The medicated ration must not repel the rodents although it does not necessarily have to attract in the sense of being absolutely preferred over other rations. Hence, the medicated ration retains the natural flavor of the dietary constituents after the essential active ingredient is incorporated therein. Such incorporation provides a final mixture of blend throughout which the active ingredient is uniformly distributed. Such active ingredient can be added to the ration by mixing both as solids or as liquids, by addition to a solid ration of a solution or suspension of the active ingredient in a liquid which is then removed to leave a dry solid mixture, for example, a solution or suspension in water or ethanol; by adding the active ingredient in the form of coated particles or pellets, coated, for example, by coacervation with gelatin, or by coating with an alcohol solution of a water-soluble type of ethyl cellulose. The final ration containing the coated particles or pellets is the preferred form because of its tendency to better mask any undesirable taste of the essential active ingredient. The rations contain the essential active ingredient in a concentration sufficient to cause lesions in the excurrent duct (epididymal lesions) and permanent infertility in otherwise fertile male rats, when they ingest the compositions in their usual manner of providing for their metabolic needs. Illustratively, most mature male rats that ingest an amount of the ration providing at least about 140 mg. per kilogram of rat body weight become irreversibly infertile as shown by epididymal lesions and by sterile matings with fertile females. As will be apparent, rats eating ad libitum will consume different amounts of the active ingredient-containing rations. Hence, to provide about 140 mg. per kilogram in a rat eating a smaller amount of the effective ration, a more concentrated ration must be provided than for a rat consuming a larger amount of the same ration. In the latter case, a less concentrated ration is operable. For example, in rats weighing about 200 to 250 gm. and consuming about 20 to 25 gm. of ration at one feeding, the ration may contain 0.4% by weight of the active ingredient. Thereby, the 250 gm. rat consuming 10 gm. of the treated edible preparation ingests 40 mg. of the active ingredient equivalent to about 160 mg. per kilo. With this same ration containing 0.4% active ingredient, a 200 gm. rat eating 25 gm. at one feeding ingests 100 mg. of the active ingredient, equivalent to about 500 mg. per kilo. Such variations will occur due to the eating habits of the rats. Hence, various embodiments of the rodent-control preparations are within the inventive concept provided they contain an effective amount of the essential active ingredient to cause the males to acquire the epididymal lesions of infertility.

The aforesaid embodiments of this inventive concept provide a method of controlling fertility of male rats, which consists essentially of providing in locales available to and frequented by said male rats rations supplying an effective amount of a compound of the formula $$YR_1OCH_2CH(OR)CH_2Cl$$

wherein Y is OH or $ClCH_2CH(OR)CH_2O$—; $R_1$ is chosen from the group consisting of an alkylene radical of 2 to 16 carbon atoms, inclusive, an alkenylene radical of 4 to 16 carbon atoms, inclusive, an alkynylene radical of 4 to 16 carbon atoms, inclusive; and R is hydrogen or an acyl radical of a hydrocarbon carboxylic acid of 1 to 18 carbon atoms, inclusive, for preventing impregnation of receptive sexually mature female rats by the male counterparts thereof.

Preferably, the rations supply to the recipient from about 60 to 300 mg./kg. of body weight thereof. At this level most rats acquire reversible infertility and a reduction in rat population ensues in time. At a dose of more than about 400 mg./kg. an irreversible infertility takes place.

Expressed as percentage by weight of the edible composition, the active ingredient amounts to from about 0.2% to about 2%, such range being not limited thereto for it includes within the range the other percentages such as 0.4%, 0.8%, 1.2% and 1.6%. A more concentrated preparation, say up to about 4% or even 20%, is satisfactory provided it is, upon use, diluted with the aforesaid edible dietary constituents to provide operative amounts of the essential active ingredient without wasting active material. These embodiments of the inventive concept are made available to the rats, for control of the population thereof by placing the preparation in and about the locales available to and frequented by the rats.

In accordance with these and other embodiments of the inventive concept, the following are additional examples of the manner and process of making and using the invention but are not to be construed as limitations.

Example 3.—Solid ration for wild rats and method

Twelve captured wild rats (*Rattus norvegicus*) are individually caged and afforded access to a medicated ration containing 0.4% by weight of 1,1'-(pentamethylenedioxy)bis[3-chloro-2-propanol]. The average amount of ration consumed overnight is found to be about 22 gm., showing a dosage of about 88 mg. of the essential active ingredient. Six days later the rats are sacrificed and found to have an average body weight of about 300 gm. This weight indicates that the average dosage of active ingredient is about 290 mg. per kilo. Ten of the twelve rats are found to have the epididymal lesions characteristic of irreversible infertility.

Example 4.—Solid rat ration and methods

A rat ration containing the usual dietary ingredients, protein, carbohydrate, fat, minerals and vitamins is medicated by incorporating therein a sufficient quantity of 1,1' - (pentamethylenedioxy)bis[3-chloro-2-propanol] to provide a concentration of about 0.4% by weight. This ration is placed in and about a grain storage area where wild rats are observed and considerable loss of grain occurs. There follows a gradual reduction in rat population in the area such that contamination of the grain and loss thereof are both significantly reduced.

Although not necessary to the several embodiments heretofore described, other active ingredients can be included in the preparations and methods. The amounts of such ingredients are determined in reference to their known biological and physiological properties. Such ingredients are anticoagulant-rodenticides, e.g., 2-diphenylacetyl-1,3-indandione, and its salts (U.S. Pat. 2,900,302), 3-(α-ethylbenzyl)-4-hydroxycoumarin and its chloro derivative, 3 - (α-ethyl-β-chlorobenzyl)-4-hydroxycoumarin, 3 - (α-acetonyl - 4 - chlorobenzyl)-4-hydroxycoumarin, 3-(α-acetonyl-furfuryl)-4-hydroxycoumarin, 2 - pivalyl-1,3-indandione, calcium salt of 2-isovaleryl-1,3-indandione and the like; stomach poisons, e.g., sodium fluoroacetate, α-naphthylthiourea, thallium sulfate, zinc phosphide, arsenic trioxide, strychnine, and red squill; estrogens, e.g., mestranol, ethinyl estradiol, diethyl stilbestrol, and chlorotrianisene; androgens, e.g., fluoxymestrone and methyltestosterone; and progestogens, e.g., melengestrol acetate, ethisterone, medroxyprogesterone acetate, and norethindrone. Depending upon locale, e.g., farm, urban, business, and type of pest to be controlled and desired effect thereupon, these additional active ingredients are beneficial in controlling vertebrate pests, e.g., such as rats, moles, nutria, squirrels, gophers, gerbils, dogs, hares and coyotes. In rat control the use of the additional anticoagulant active ingredient reduces the rat population sooner than expected. Similar beneficial effects attend the use of the additional stomach poison active ingredient.

We claim:

1. A method of reversibly preventing impregnation by a sexually mature male rat which consists essentially of administering systemically to said rat an effective amount for preventing impregnation of a compound of the formula $$YR_1OCH_2CH(OR)CH_2Cl$$

wherein Y is OH or $ClCH_2CH(OR)CH_2O$—; $R_1$ is selected from the group consisting of alkylene of 2 to 16 carbon atoms, inclusive, and 2-butynylene; and R is hydrogen or selected from the group consisting of formyl, acetyl, propionyl, butyryl, isobutyryl, valeryl, isovaleryl, and caproyl.

2. The method of claim 1 wherein the compound is 1,1'-(pentamethylenedioxy)bis[3-chloro-2-propanol].

3. A method of producing epididymal lesions and irreversible infertility in a sexually mature male rat which consists essentially of supplying to said rat, in locales available to and frequented by said rat, a ration supplying an effective amount for producing epididymal lesions and irreversible infertility being at least about 300 mg. per kilogram of body weight of said rat per day of a compound of the formula $$YR_1OCH_2CH(OR)CH_2Cl$$

wherein Y is OH or $ClCH_2CH(OR)CH_2O-$; $R_1$ is selected from the group consisting of alkylene of 2 to 16 carbon atoms, inclusive, and 2-butynylene; and R is hydrogen or selected from the group consisting of formyl, acetyl, proprionyl, butyryl, isobutyryl, valeryl, isovaleryl, and caproyl.

4. The method of claim 3 wherein the compound is 1,1'-(pentamethylenedioxy)bis[3-chloro-2-propanol].

5. The method of claim 3 wherein the ration contains from about 0.2% to about 2% by weight of said compound.

References Cited

UNITED STATES PATENTS

| | | | |
|---|---|---|---|
| 2,921,050 | 1/1960 | Belanger | 260—47 |
| 2,951,854 | 9/1960 | Chiddix et al. | 260—348 |

FOREIGN PATENTS

| | | |
|---|---|---|
| 794,632 | 5/1958 | Great Britain. |
| 970,268 | 9/1964 | Great Britain. |

JEROME D. GOLDBERG, Primary Examiner

A. J. ROBINSON, Assistant Examiner

U.S. Cl. X.R.

424—311, 312, 314